United States Patent [19]
Rossi

[11] 3,946,949
[45] Mar. 30, 1976

[54] NOZZLE FOR ROTARY KILN

[75] Inventor: Eugene F. Rossi, Wauwatosa, Wis.

[73] Assignee: Allis-Chalmers Corporation, Milwaukee, Wis.

[22] Filed: Sept. 4, 1974

[21] Appl. No.: 503,135

[52] U.S. Cl. .................. 239/600; 239/117; 266/41
[51] Int. Cl.² ..... B05B 1/00; C21B 7/16; C21C 5/48
[58] Field of Search .................. 75/72, 82; 222/413; 251/62; 260/20, 41; 432/105, 109, 113; 239/116, 117, 276, 600

[56] References Cited
UNITED STATES PATENTS

| | | | |
|---|---|---|---|
| 1,844,653 | 2/1932 | Hechenbleikner | 239/117 |
| 2,395,483 | 2/1946 | James | 239/117 |
| 3,062,641 | 11/1962 | Drosten et al. | 266/41 |
| 3,547,624 | 12/1970 | Gray | 266/41 |
| 3,784,107 | 1/1974 | Rossi | 239/600 |

*Primary Examiner*—Lloyd L. King
*Attorney, Agent, or Firm*—Robert C. Sullivan

[57] ABSTRACT

A nozzle for use with a rotary kiln of the type used for reducing ore, such as iron ore, to a lower state of oxidation. The nozzle projects in a generally radial direction through the kiln shell to inject fluid into the interior of the rotary kiln. The nozzle comprises a gas passage for admitting a reductant gaseous fluid such as natural gas (methane) or an oxidizing fluid such as air into the kiln at appropriate times in the cycle of rotation of the kiln. The nozzle also includes a central oil tube slidably adjustably mounted in a sleeve which extends to the nozzle tip. The gas passage through the nozzle forms a hollow chamber around the sleeve in which the oil tube is enclosed, whereby the gas passing through the hollow chamber provides a cooling action on the oil tube and on the nozzle tip. The discharge outlet of the oil tube may be located within its enclosing sleeve in spaced relation to the nozzle tip, and in a cooler zone than the nozzle tip, whereby to minimize clogging of the oil tube discharge outlet by carbon deposits or the like. The central oil tube may be slidably moved within its enclosing sleeve to permit cleaning of carbon deposits from the nozzle tip. A quick disconnect coupling at the inlet end of the central oil tube permits disconnection of the oil supply to the oil tube while the kiln is rotating, permitting insertion of a cleaning rod in the oil passage of the central oil tube to "rod out" the central oil tube, the cleaning rod being extendible into cleaning engagement with the nozzle tip. The central oil tube may also be completely removed and replaced with another oil tube while the kiln is rotating.

22 Claims, 4 Drawing Figures

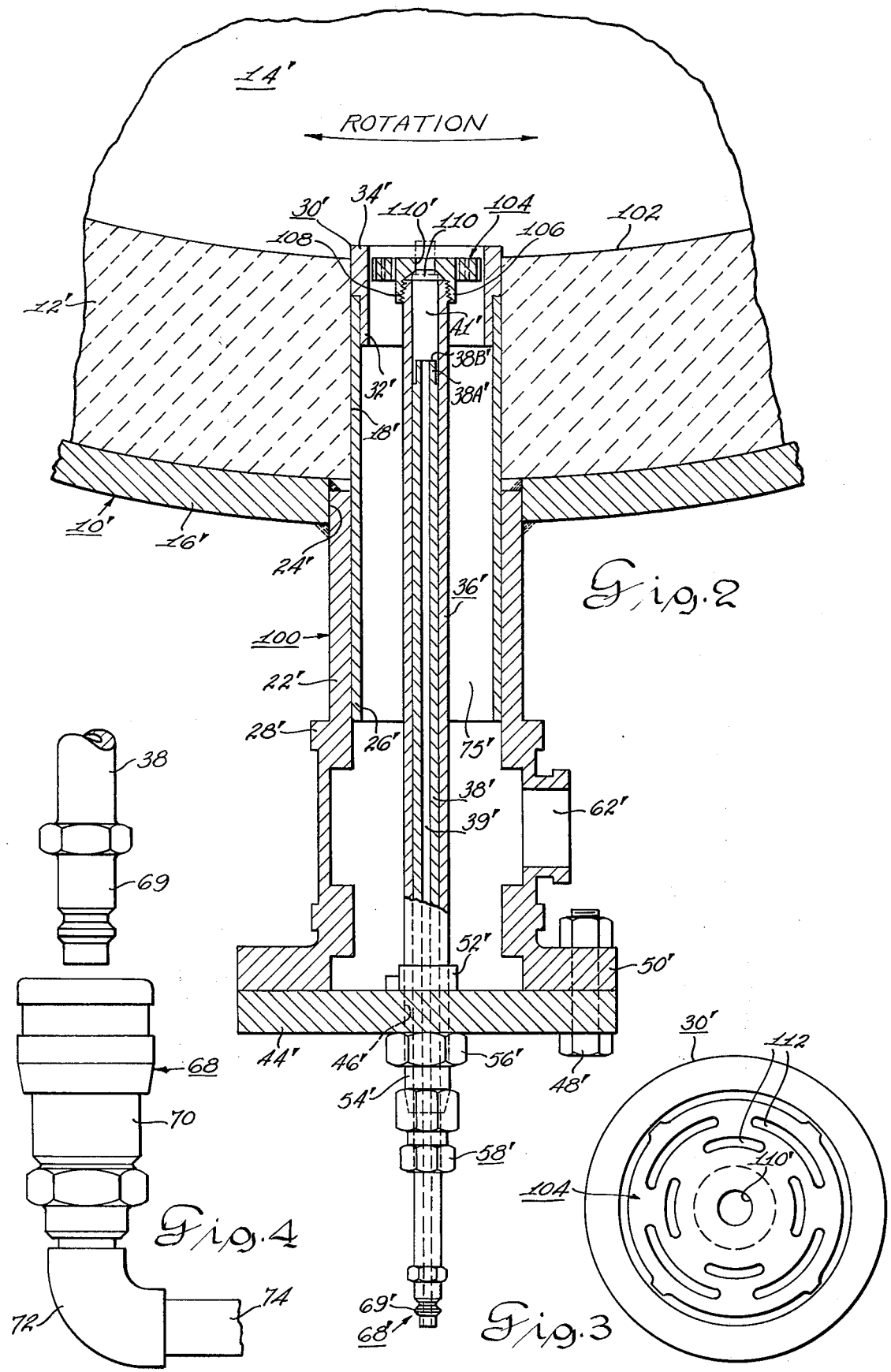

NOZZLE FOR ROTARY KILN

BACKGROUND OF THE INVENTION

Field of the Invention

This invention relates to nozzles for rotary kilns used for such purposes as reducing iron ore to a lower state of oxidation. In such kilns, a plurality of nozzles may be mounted on the outer surface of the kiln and project radially through the kiln shell to inject fluid into the kiln at circumferentially and axially spaced locations along the length of the shell.

STATEMENT OF THE INVENTION

It is an object of the invention to provide a nozzle for mounting on and rotation with a rotary reducing kiln in which a given nozzle is adapted to inject into the kiln a liquid reductant such as a hydrocarbon oil or alternatively to inject a suitable gaseous reductant when the nozzle is in an appropriate position such as beneath the bed of ore, and still further alternately to inject into the kiln a gaseous oxidizing agent such as oxygen or air when the nozzle is in the appropriate position such as above the bed of ore.

It is still a further object of a preferred embodiment of the invention to provide a nozzle for a rotary reduction kiln or the like in which the passage for the liquid fluid through the nozzle is entirely segregated from the passage for the gaseous fluid through the nozzle.

It is still a further object of the invention to provide a nozzle construction for use in a rotary reduction kiln or the like which is so constructed that the flow of gaseous fluid through the nozzle is in cooling relation to the passage for the liquid fuel (such as a hydrocarbon liquid or oil) through the nozzle, whereby to minimize carbon deposits and other undesirable deposits in the oil passage, including the passage through the nozzle tip, which deposits are associated with the presence of excess heat.

It is still a further object of the invention to provide a nozzle construction for use in a rotary reduction kiln or the like in which the nozzle tip is easily cleaned of carbon deposits or the like by manipulation of the central oil tube which forms part of the nozzle assembly.

It is still a further object of the invention to provide a nozzle assembly for a rotary reduction kiln or the like which permits cleaning of the oil tube and of the nozzle tip by "rodding" while the kiln is rotating, or which permits easy removal and replacement of the oil tube while the kiln is rotating.

In achievement of these objectives, there is provided in accordance with an embodiment of the invention, a nozzle for use with a rotary kiln of the type used for reducing ore, such as iron ore, to a lower state of oxidation. The nozzle, which may be one of many similar axially and circumferentially spaced nozzles mounted on the kiln, projects in a generally radial direction through the kiln shell to inject fluid into the interior of the rotary kiln. The nozzle comprises a gas passage for admitting a reductant gaseous fluid such as natural gas (methane) or an oxidizing fluid such as air into the kiln at appropriate times in the cycle of rotation of the kiln. The nozzle also includes a central oil tube slidably adjustably mounted in a sleeve which extends to the nozzle tip. The gas passage through the nozzle forms a hollow chamber around the sleeve in which the oil tube is enclosed, whereby the gas passing through the hollow chamber provides cooling action on the oil tube and on the nozzle tip. The discharge outlet of the oil tube may be located within its enclosing sleeve in spaced relation to the nozzle tip and in a cooler zone than the nozzle tip, whereby to minimize clogging of the oil tube discharge outlet by carbon deposits or the like. By loosening a compression fitting which secures the central oil tube to its enclosing sleeve, the central oil tube may be slidably moved within its enclosing sleeve to permit cleaning of carbon deposits from the nozzle tip. A quick disconnect coupling at the inlet end of the central oil tube permits disconnection of the oil supply to the oil tube while the kiln is rotating, permitting insertion of a cleaning rod in the oil passage of the central oil tube, the cleaning rod being extendible into cleaning engagement with the nozzle tip. By loosening the aforesaid compression fitting, with the elements of the quick disconnect coupling also detached, the central oil tube may be completely removed and replaced with another oil tube, all while the kiln is rotating. An important feature of the construction is the fact that the oil passage which forms part of the nozzle structure is fluidly isolated from the passage through the nozzle for the gaseous fluids handled by the nozzle such as natural gas or air. The inlets of the nozzle to the gaseous fluids and to the liquid hydrocarbon (if used) are connected by valving to the appropriate fluid supply manifolds at appropriate times in the rotation of the kiln.

Further objects and advantages of the invention will become apparent from the following description taken in conjunction with the accompanying drawing in which:

BRIEF DESCRIPTION OF THE DRAWINGS

FIG. 2 is a view in section of a modified nozzle in accordance with the invention, of the type in which the nozzle tip is substantially flush with the inner periphery of the kiln, rather than projecting into the interior of the kiln;

FIG. 3 is a plan view of the nozzle of FIG. 2, as it would be seen from the interior of the kiln; and FIG. 4 is an enlarged view of the quick disconnect coupling for the oil tube.

DESCRIPTION OF PREFERRED EMBODIMENTS

Figure 1:
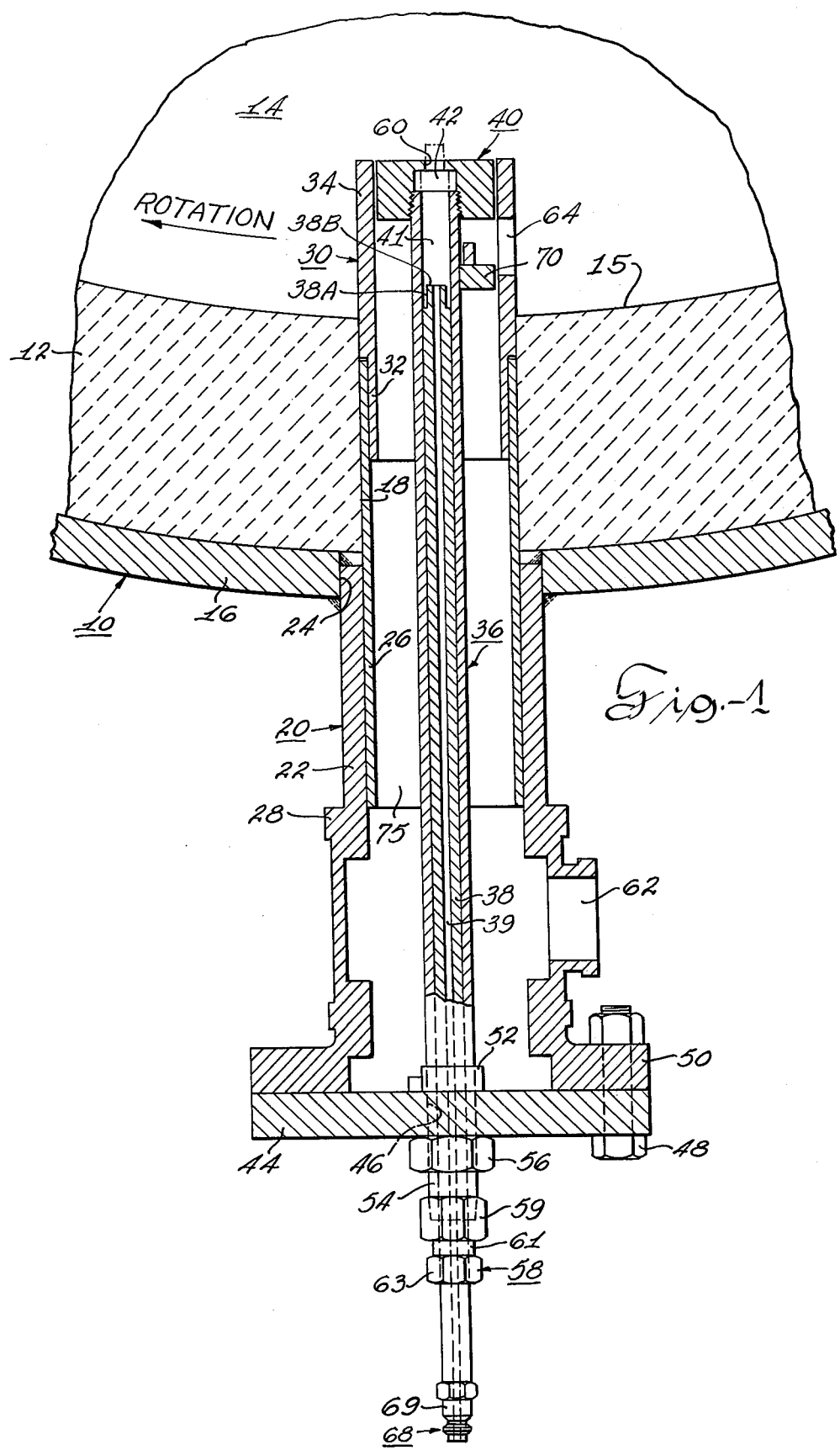
FIG. 1 is a view in section of a nozzle in accordance with the invention extending through the wall of rotary kiln and projecting into the interior of the rotary kiln.

Referring now to FIG. 1 of the drawings, there is shown a portion of a rotary reduction kiln generally indicated at 10 comprising an inner lining or wall 12 constructed of any suitable refractory material such as fire brick defining a combustion chamber 14, and an outer wall or shell 16 generally constructed of metal. Kiln 10 may typically have a diameter in the range of 10 to 20 feet, for example, and typically may rotate at a speed such as one-half revolution per minute. A plurality of openings 18 are provided through the kiln wall to the combustion chamber. Each opening 18 extends through lining 12 and also through outer wall or shell 16. The portion of opening 18 which extends through outer wall 16 is of larger diameter and is indicated at 24. These openings 18 are circumferentially and axially spaced about the surface of the kiln and each opening 18 receives a nozzle such as that generally indicated at 20 for delivery of fluid into the combustion chamber. In a typical reduction kiln, there may be one hundred or more of the openings 18 each having a nozzle 20 positioned therein, and the drawing of FIG. 1 illustrates but one of a plurality of such nozzles. The kiln shown in FIG. 1 should rotate in a clockwise direction relative to the view of FIG. 1, as shown by the arrow in FIG. 1, to minimize any tendency of ore pellets or the like to enter fluid discharge port 64.

The nozzle 20 comprises an elongated hollow nozzle body including what might be referred to as a hollow generally cylindrical outer casing 22 which is rigidly secured as by welding at its inner end to opening 24 in the outer wall or shell 16. The nozzle body also includes a hollow cylindrical first inner sleeve 26 which is telescopically received within the interior of casing 22, sleeve 26 having an outer diameter just slightly less than the inner diameter of casing 22. Sleeve 26 is suitably detachably connected to casing 22. Sleeve 26 extends radially outwardly relative to the axis of the kiln to a suitable location which in the illustrated embodiment is shown as being substantially coincident with the location of the enlarged shoulder 28 of casing 22. The radially inner end of sleeve 26 terminates contiguous but spaced radially outwardly a short distance from the inner periphery 15 of kiln lining 12.

The nozzle body also includes a second or radially inner (relative to the axis of the kiln) hollow cylindrical sleeve generally indicated at 30 which is telescopically engaged with the radially inner end of the first inner sleeve 26. The sleeve 30 includes a reduced diameter portion 32 having an outer diameter just slightly less than the inner diameter of the first sleeve 26 whereby to permit the portion 32 of the sleeve 30 to telescopically engage the radially inner end of the first sleeve 26. The remaining or radially inner portion of sleeve 30, indicated at 34, is of greater thickness than portion 32 and has an outer diameter just slightly less than the inner diameter of opening 18 through kiln lining 12. The radially inner end of sleeve 30 projects inwardly into the interior of the kiln for a short distance, for example 6 inches, where it lies beneath the ore being reduced when the nozzle is in the phase of rotation of the kiln in which it lies beneath the ore bed.

Unless otherwise indicated, the terms "radially inner" and "radially outer" used in the specification and claims are relative to the longitudinal axis of the rotary kiln.

Concentrically and coaxially located within the nozzle 20 and along the central longitudinal axis of nozzle 20 which extends radially of the kiln is a hollow cylindrical sleeve member generally indicated at 36 which encloses a cylindrical central oil tube generally indicated at 38. Oil tube 38 may be made of a material such as carbon steel for example. Sleeve member 36 does not necessarily have to be concentric and coaxial with nozzle 20 and could be eccentrically located relative to he longitudinal axis of nozzle 20.

Oil tube 38 is provided throughout its length with a central oil passage 39 which may be, for example, of the order of magnitude of one-eighth inch in diameter. Oil tube 38 typically may have a diameter of one-half inch.

There are several reasons for providing a relatively narrow diameter oil passage 39 (such as ⅛ inch diameter) in oil tube 38, as follows:

1. The small diameter of passage 39 causes the oil or liquid fuel to emerge from oil tube 38 with substantial velocity; and 2. The relatively small diameter of passage 39 causes a minimum reservoir of oil to remain in tube 38 on the downstream side of the cut-off valving to the nozzle after the oil supply to the nozzle has been cut off, which substantially eliminates any dumping of oil from oil tube 38 after the oil supply to the nozzle has been cut off and the nozzle has moved from beneath the ore bed.

Oil tube 38 terminates at its radially inner end in a reduced diameter end portion 38A, the radially innermost end of which is indicated at 38B. A cylindrical closure member generally indicated at 40 which constitutes the nozzle tip is received within the radially inner end (relative to the axis of the kiln) of sleeve 30. Closure 40 is unapertured except for a centrally located passage therethrough generally indicated at 42 which serves as an outlet into the kiln for oil discharged from central oil tube 38, as will be explained in more detail hereinafter. Passage 42 terminates at its radially inner end in a reduced diameter discharge orifice 60. Closure 40 serves to prevent passage of ore into the hollow space or chamber 75 within the nozzle structure between the centrally located sleeve 36 which surrounds oil tube 38 and sleeves 26 and 32. Closure or nozzle tip 40 is held in position by its engagement with the threaded tapered upper end of sleeve 36 which engages a similarly tapered and threaded opening in the radially outer end of closure 40.

The radially outer end of sleeve 36 extends through a passage 46 in an end closure plate 44 which closes the radially outer end (relative to the kiln axis) of nozzle 20. Bolts 48 extend through closure plate 44 and through flange 50 at the radially outer end of nozzle casing 22 to secure closure plate 44 in assembled position as shown in the drawing. Sleeve 36 is provided with an integral shoulder 52 which seats on the inner surface of closure plate 44 and serves as a limiting stop which properly positions sleeve 36. The external surface of the portion of the sleeve 36 which projects radially outwardly of end closure plate 44 is threaded as indicated at 54 and a nut 56 engages thread 54 and is tightened up against the radially outer surface of end plate 44 to hold sleeve 36 in assembled position relative to end plate 44 and also relative to the rest of the nozzle structure.

The central oil tube 38 which is coaxially positioned within the sleeve 36 extends radially outwardly of closure plate 44 and also radially outwardly of the radially outer end of sleeve 36. The location of the radially inner end 38B of oil tube 38 can be adjusted by means of the reusable compression fitting assembly generally indicated at 58 which clamps the outer surface of central oil tube 38 and which may be loosened to permit movement of oil tube 38. As will be explained in more detail, compression fitting 58, together with quick detachable coupling 68 to be described, also permit easy removal and replacement of the central oil tube 38 while the kiln is rotating.

Compression fittings per se are well known in the art and need not be described in detail. It might be noted that the compression fitting assembly 58 is anchored to the radially outer end of sleeve 36 by a nut 59 forming part of assembly 58 and which is in screw threaded engagement with the radially outer end of sleeve 36. The radially outer end of nut 59 supports a bushing-like member 61 having external threads which are in screw-threaded engagement with internal threads on nut 63. Nut 63 encloses a conical ferrule element of plastic material such as Teflon (not shown) which is coaxially positioned about the outer surface of central oil tube 38. When nut 63 is rotated in one direction it tightens the conical ferrule element into clamping engagement with the external surface of oil tube 38 without deforming the surface of oil tube 38, to thereby maintain oil tube 38 in a fixed position relative to sleeve 36. When nut 63 is rotated in the opposite direction, it loosens the engagement of the conical ferrule element relative to the external surface of oil tube 38, permitting oil tube 38 to be moved relative to sleeve 36. Compression fittings of the type hereinbefore described and shown are commercially available and may be obtained, for example, from Crawford Fitting Company, 884 East 140th Street, Cleveland 10, Ohio, as described in their catalog B-959 entitled SWAGELOK* Tube Fittings, copyright 1959 by Crawford Fitting Company, Cleveland, Ohio.

*(registered trademark)

As seen in the view of FIG. 1, the end 38A of oil tube 38 is positioned a few inches radially outwardly of the orifice 60 of nozzle tip 40. In fact, in the view shown in the drawing, central oil tube 38 is so located in its surrounding sleeve 36 that end 38B of oil tube 38 is normally positioned a few inches radially outwardly of the radially inner end of sleeve 36. The optimum position of end 38B of central oil tube 38 relative to nozzle tip 40 may be adjusted to locate end 38B of central oil tube 38 at a location which is sufficiently cooler than nozzle tip 40 to minimize undesirable carbon at the outlet end 38B of oil tube 38, and once the optimum position of the end 38B which prevents overheating and undesirable carbon deposits has been determined, central oil tube 38 may be maintained in this position by tightening the compression fitting 58 as previously described. In this optimum position of end 38B of oil tube 38, the discharge end of the oil tube 38 will remain open and unclogged due to the minimization of overheating of end 38B and minimization of carbon deposits associated with overheating.

Casing portion 22 of nozzle 20 is provided with an inlet port 62 which may be connected to a source of gaseous fluid such as air or methane depending upon the part of the cycle of rotation of the kiln in which the given nozzle is located at a given moment. The radially inner end portion of sleeve 30 which projects into the interior of the kiln is provided with an outlet opening 64 in the wall thereof through which the gaseous fluid admitted through port 62 may pass into the kiln. In passing from inlet port 62 to outlet port 64, the gas passes through a hollow chamber 75 bounded by the outer surface of tube 36 and by the inner surface of casing 22 and of sleeves 26 and 30. A baffle 70 is positioned in the nozzle structure between the outer periphery of sleeve 36 and the inner periphery of sleeve 30 in the region of the gaseous fluid discharge passage 64. Baffle 70 serves to prevent the ore pellets or the like from falling through port 64 into the interior of the nozzle structure.

An important feature of the nozzle structure is the cleanability feature of the construction which permits the central oil tube 38 to be reciprocated linearly within sleeve 36 and in such manner as to clean carbon deposits or other extraneous matter from the nozzle tip 40 and from the radially inner portion 41 of sleeve 36 near nozzle tip 40. Thus, if compression fitting 58 is loosened, central oil tube 38 may be moved radially inwardly within sleeve 36 and relative to the rotary kiln axis to the extreme position shown in dotted line in FIG. 1 in which the end or tip portion 38A of central oil tube 38 projects into passage 42 of nozzle tip 40 and, in fact, the reduced diameter end portion 38A of oil tube 38 may even be projected with a sliding fit through orifice 60 and beyond the radially inner surface of nozzle tip 40 and into the interior of the kiln, to thereby permit cleaning by movement of oil tube 38 of carbon deposits or other extraneous material which has accumulated in the passage 42 in the nozzle tip, including orifice 60, or in the communicating passage 41 bounded by the inner surface of the radially inner portion of sleeve 36 contiguous nozzle tip 40.

A quick disconnect coupling generally indicated at 68 is provided for detachably connecting the inlet end of oil tube 38 to a source of oil supply. As best seen in FIG. 4, the quick disconnect coupling includes a male element 69 which is screw-threadedly attached to the radially outer end of oil tube 38. The female element 70 of the quick disconnect coupling is connected to a elbow 72 which in turn is connected to a flexible tubular conduit 74 leading to the source of oil supply. The female element 70 has built in thereto a spring biased check valve (not shown) which closes to interrupt the oil flow through conduit 74 when the male element 69 is withdrawn from engagement with the female element 70 of the quick disconnect coupling. However, engagement of the male element 69 with the female element 70 pushes the check valve to an open position which permits oil to flow from the source of supply through conduit 74 and the coupled elements 69–70 of the quick disconnect coupling to the inlet end of oil tube 38.

It can be seen that the provision of the quick disconnect coupling permits the female disconnect element 70 to be disconnected from the male disconnect element 69 while the kiln is rotating to permit insertion of a cleaning rod into the central longitudinal bore or oil passage 39 of oil tube 38 to permit cleaning of the oil tube passage 39, and also to permit cleaning of passage 42 through nozzle tip 40, including orifice 60 of passage 42. Also, when quick disconnect coupling 68 is uncoupled, the oil tube 38 may be removed and replaced. In removing and replacing the oil tube 38, it is, of course, necessary to loosen the compression fitting 58 to permit removal of one oil tube 38, and after the new oil tube 38 is positioned, the compression fitting 58 must again be tightened. While the coupling 68 is disconnected, the oil flow from conduit 74 is interrupted due to the fact that the internal check valve in female element 70 has moved to closed position. Quick disconnect couplings of the type just described are well known per se and are commercially available. For example, a quick disconnect coupling of the type hereinbefore described is manufactured and sold by The Hansen Manufacturing Company, 4031 West 150th Street, Cleveland, Ohio 44135.

The nozzle structure hereinbefore described may be used with varying combinations of fluids in a direct reduction kiln. For example, if natural gas (methane) is being used as the reductant, the port 62 is connected by suitable valving and manifolding means to the source of methane during the period when the given nozzle 20 rotates beneath the bed of ore. As the given nozzle 20 rotates from beneath the bed of ore, the reductant gas connection to port 62 of the given nozzle is disconnected; and when the given nozzle reaches an elevated position above the ore bed, the port 62 may then be connected to a source of oxidizing gas such as air or oxygen. In the example just cited a gaseous fluid is used as the reductant and a gaseous fluid is used as the oxidizing gas, and the oil tube portion of the assembly is not used. In fact, in the situation just described if oil is not to be injected through the given nozzle, the sleeve 36 may be plugged with a "dummy" in place of oil tube 38. However, in another situation instead of using a gaseous reductant, the central oil tube 38 of the same nozzle may be connected during at least part of the portion of the cycle of rotation of the kiln during which the nozzle is rotating beneath the ore bed to a pressurized source of oil or liquid hydrocarbon reductant which is suitably connected by appropriate valving and manifold means to the inlet end of the central oil tube 38 during the predetermined period when the nozzle is passing beneath the ore bed.

When oil is used as a reductant, the oil is injected from orifice 60 of nozzle tip passage 42 into the bed of ore. After the given nozzle has passed beneath the predetermined portion of the ore bed into which oil is to be injected, the source of the liquid hydrocarbon to oil tube 38 is disconnected, and at a suitable time during the cycle of rotation when the nozzle is in an elevated position above the ore bed, port 62 may be connected by suitable valving and manifold means to a source of oxidizing gas such as air or oxygen which exits from the nozzle structure into the kiln through outlet port 64. The source of oxidizing gas is disconnected from port 62 after the nozzle has passed through a predetermined angular rotation above the bed of ore.

If the nozzle is used for injecting a reductant gas and an oxidizing gas into the kiln via ports 62-64 of a given nozzle at appropriate times during the cycle of rotation of the rotary kiln, a valving and control system similar to that used in my U.S. Pat. No. 3,794,483, issued Feb. 26, 1974, may be used for controlling admission of the respective gaseous fluids to the kiln at the proper times during the cycle of rotation. If a liquid hydrocarbon such as oil is injected into the kiln through central oil tube 38 and nozzle tip 40, the flow of oil to the inlet end of oil tube 38 may be controlled by a separate ON-OFF valve, controlled by a cam-operated control system analagous to that shown in FIG. 2 of my aforementioned U.S. Pat. No. 3,794,483, but with appropriate modifications, whereby to cause the liquid hydrocarbon to be injected into the kiln only while the given nozzle is passing beneath the ore bed or beneath a portion of the ore bed.

It can be seen from the foregoing that a given nozzle in accordance with the construction of the invention is capable of handling a gaseous fluid which passes through inlet port 62 and which passes outwardly into the kiln through outlet opening 64, the gaseous fluid being, for example, methane during the reduction portion of the cycle of rotation, or an oxygen-containing gas such as oxygen or air during the oxidizing portion of the cycle of rotation. The same nozzle is also equipped to handle and dispense a liquid fluid or fuel such as a liquid hydrocarbon (oil) which may be injected into the ore bed as the given nozzle is rotating beneath the ore bed instead of using a gaseous reductant.

Referring now to FIGS. 2 and 3, there is shown a modified nozzle structure which is adapted for use where it is desired that the nozzle tip be mounted substantially flush with the inner periphery of the kiln rather than projecting into the interior of the kiln as in the embodiment of FIG. 1. The kiln shown in FIG. 2 can rotate in either direction.

As seen in FIGS. 2 and 3, there is shown a nozzle assembly generally indicated at 100 which in many respects is similar to the nozzle structure of FIG. 1 and differs principally from the structure of FIG. 1 in the structure of the nozzle tip.

In describing the modified nozzle of FIGS. 2-3, parts similar to parts of the nozzle structure of FIG. 1 will use the same numbers as FIG. 1 but primed (').

There is shown a portion of a rotary kiln generally indicated at 10' similar to that described in connection with FIG. 1 and comprising an inner lining or wall 12' constructed of any suitable refractory material such as fire brick defining a combustion chamber 14' and an outer wall or shell 16' generally constructed of metal. The nozzle generally indicated at 100 lies in an opening 18' which extends through lining 12', nozzle 100' also extendng through enlarged portion 24' of opening 18' in outer wall or shell 16'. As explained in connection with FIG. 1, a large number of axially and circumferentially spaced openings 18' are provided about the surface of the kiln and FIG. 2 shows one such opening 18' having one nozzle received in said opening 18'.

The nozzle 100 comprises an elongated hollow nozzle body including a cylindrical outer casing 22' which is rigidly secured as by welding at its radially inner end to enlarged opening 24' in outer wall or shell 16'. The nozzle body also includes a hollow cylindrical first inner sleeve 26' which is telescopically received within the interior of casing 22', sleeve 26 having an outer diameter just slightly less than the inner diameter of casing 22'. Sleeve 26' extends radially outwardly relative to the axis of the kiln to a suitable location which in the illustrated embodiment is shown as being substantially coincident with the location of the enlarged shoulder 28' of casing 22'. The radially inner end of sleeve 26' terminates contiguous but spaced radially outwardly a short distance from the inner periphery 102 of kiln lining 12'.

The nozzle body also includes a second or radially inner (relative to the axis of the kiln) hollow cylindrical sleeve generally indicated at 30' which is telescopically engaged with the radially inner end of the first inner sleeve 26'. Sleeve 30' includes a reduced diameter portion 32' having an outer diameter just slightly less than the inner diameter of first sleeve 26' whereby to permit the portion 32' of sleeve 30' to telescopically engage the radially inner end of first sleeve 26'. The remaining or radially inner portion of sleeve 30' indicated at 34' is of greater thickness than portion 32' and has an outer diameter just slightly less than the inner diameter of opening 18' through kiln lining 12': The radially inner end of sleeve 30' projects a short distance inwardly into the interior of the kiln, for example 2 inches, where it lies beneath the ore being reduced when the nozzle is in the phase of rotation of the kiln in which it lies beneath the ore bed. Coaxially located within the nozzle 100 along the central longitudinal axis of nozzle 100' which extends radially of the kiln is a hollow cylindrical sleeve member generally indicated at 36' which encloses a cylindrical central oil tube generally indicated at 38'. Sleeve member 36' need not necessarily be coaxial relative to nozzle 10'. Oil tube 38' is provided throughout its length with a small diameter central oil passage 39' similar to that described in connection with the embodiment of FIG. 1. Oil tube 38' terminates at its radially inner end in a reduced diameter end portion 38A', the radially innermost end of which is indicated at 38B'.

A cylindrical closure member generally indicated at 104 which constitutes the nozzle tip is received within the radially inner end (relative to the axis of the kiln) of sleeve 30'. Closure or nozzle tip 104 is provided on its radially outer surface thereof which extends radially outwardly of the kiln axis with a hollow neck portion generally indicated at 106 having internal threads 108 thereon which engage cooperating external threads on the radially inner end of sleeve 36' whereby to secure neck portion 106 of nozzle tip 104 rigidly but detachably engaged with the radially inner end of sleeve 36'. Nozzle tip 104 is provided with a centrally located oil passage 110 therethrough, terminating in a reduced diameter orifice 110', which communicates with the hollow interior 41' of the upper end of the sleeve 36' which encloses oil tube 38', whereby the pressurized oil ejected from the outlet end 38B' of oil tube 38' passes through space 41' in sleeve 36' and through passage 110 and orifice 110' in nozzle tip 104, and thence into the ore bed in the kiln. It will be noted that the radially inner surface of nozzle tip 104 (relative to the kiln axis) is so located as to be substantially flush with the inner periphery 102 of kiln 10', in contrast to the structure of FIG. 1 in which nozzle tip 40 projects into the hollow interior of the kiln. Nozzle tip 104 of FIGS. 2 and 3 is provided with a plurality of concentric radially spaced (relative to the longitudinal axis of nozzle 100) rows of arcuately spaced gas passages 112 through which gaseous fluids exit into the kiln from the hollow space or chamber 75' bounded by the exterior surface of sleeve 36' and by the interior surface of casing 22' and of sleeves 26' and 30', such gaseous fluids having passed inwardly into space or chamber 75' through inlet port 62' for the gaseous fluids.

It will also be noted that in the embodiment of FIGS. 2–3, the gaseous fluids discharge through ports or passages 112 in the nozzle tip in a direction which is parallel to the longitudinal axis of the nozzle 100' or generally radial relative to the axis of the kiln. In contrast, in the structure of FIG. 1, the gaseous fluids discharge from gaseous fluid discharge port 64 of nozzle 20 in a direction substantially radially of the longitudinal axis of the nozzle or circumferentially relative to the axis of the kiln.

The radially outer end of sleeve 36' extends through a passage 46' in end closure plate 44' which closes the radially outer end (relative to the kiln axis) of nozzle 100. Bolts 48' extend through closure plate 44' and through flange 50' at the radially outer end of nozzle casing 22' to secure closure plate 44' in assembled position in the same manner as described in connection with the embodiment of FIG. 1. Sleeve 36' is provided with an integral shoulder 52' which seats on the inner surface of closure plate 44' and serves as a limiting stop which properly positions sleeve 36'. The external surface of the portion of the sleeve 36' which projects radially outwardly of end closure plate 44' is threaded as indicated at 54' and a nut 56' engages thread 54' and is tightened up against the radially outer surface of end plate 44' to hold sleeve 36' in assembled position relative to end plate 44' and also relative to the rest of the nozzle structure in the same manner ase described in connection with the embodiment of FIG. 1.

The central oil tube 38' which is coaxially positioned within sleeve 36' extends radially outwardly of closure plate 44' and also radially outwardly of the radially outer end of sleeve 36'. The oil tube 38' can be held in any given adjusted position relative to sleeve 36' by means of the reusable compression fitting assembly generally indicated at 58' which clamps the outer surface of central oil tube 38'. The reusable compression fitting assembly 58' is similar to that described in connection with the embodiment of FIG. 1. The location of the radially inner end 38B' of oil tube 38 can be adjusted to an optimum position within sleeve 36' in radially outwardly spaced relation to the nozzle tip 104 to minimize overheating of oil tube 38' and to consequently minimize carbon deposits at the outlet end of the oil tube 38', all in the same manner as described in connection with the embodiment of FIG. 1.

A quick disconnect coupling 68', similar to the quick disconnect coupling 68 described in connection with the embodiment of FIG. 1, is provided for detachably connecting the inlet end of oil tube 38' to a source of oil supply.

The oil tube 38' may have a cleaning rod inserted in the bore 39' thereof by detaching the male disconnect element 69 from the female disconnect element 70 in the manner previously described. This "rodding" operation may be performed while the kiln is rotating. As previously mentioned, typically the reduction kiln may have a diameter in the range of 10 feet to 20 feet, and typically may rotate at a speed such as 0.5 revolution per minute.

If it is desired to completely remove and replace the central oil tube 38' this may be done while the kiln rotates by loosening the compression fitting 58' to remove the central oil tube 38' and then retightening the compression fitting 58' when a new central oil tube 38' has been installed. The quick disconnect coupling is also disconnected when the central oil tube is being replaced.

The central oil tube 38' may also be used to clean the oil outlet passage 110 of the nozzle tip 104 in a manner similar to that described in connection with the embodiment of FIG. 1 and while the kiln rotates, by loosening the compression fitting 58' to permit the central oil tube 38' to be reciprocated within its enclosing sleeve 36' with the reduced diameter portion 38A' being slidably receivable within the orifice 110' of passage 110 as shown in dotted outline in FIG. 2 to thereby clean away any carbon deposits or other extraneous matter from the oil outlet passage 110 (including orifice 110' thereof) in nozzle tip 104. The quick disconnect coupling 68' is also preferably disconnected when the central oil tube is being reciprocated to clean the passage 110 (including orifice 110') in the nozzle tip, and to clean space 41' in sleeve 36'.

The nozzle structure of FIGS. 2–3 may be used in the same manner as described in connection with the embodiment of FIG. 1 to introduce desired fluids such as gaseous fluids or a liquid fuel such as oil into the kiln at appropriate times in the cycle of rotation of the kiln, all in the same manner as described in connection with the embodiment of FIG. 1.

Since in practically any direct reduction process in which either embodiment of the nozzle of the invention would be used would include connecting hollow chamber 75 from gas inlet port 62 to gas outlet port 64 during part of the cycle of rotation of the given nozzle to an oxidizing gas such as air or oxygen, the passage of such gases through chamber 75 tends to cool sleeve 36 (FIG. 1) or 36' (FIG. 2) and the central oil tube 38 or 38', and also to cool the nozzle tip 40 or 104. Thus, if during part of the cycle of the given nozzle, the nozzle were used to inject oil into the kiln, the cooling effect of the gas flow just described would aid in minimizing carbonization of the oil outlet passages of the nozzle structure, particularly of the oil outlet opening 38B (FIG. 1) or 38B' (FIG. 2) of oil tube 38 or 38', and of the liquid fuel passages 42 (FIG. 1) and 110 (FIG. 3) in the nozzle tip, as well as minimizing other deposits associated with the presence of heat.

It should be noted that during operation of the kiln, the radially inner portion of the nozzle structure, if uncooled, might approach a temperature of the order of magnitude of 1,800° Fahrenheit, for example. The cooling action of a gas such as air at ambient temperature (which might be 100° Fahrenheit or less, for example) passing through the chamber 75 or 75' at sometime during each cycle of rotation of the kiln, effects a substantial reduction in the temperature of the oil tube and of the nozzle tip, and while it does not completely eliminate carbon deposits or other deposits in the oil tube and nozzle tip associated with the presence of heat, it tends to reduce such deposits to a normally acceptable level.

A further advantage of cooling the sleeve 36 and oil tube 38, made possible by the cooperative relation of these members with gas passage or cooling chamber 75, is that the oil tube 38 can be cooled sufficiently to maintain the liquid hydrocarbon or oil in the liquid phase at least until it emerges from the end 38A or 38' of oil tube 38 or 38', which is desirable.

SUMMARY OF CLEANING PROCEDURE

A typical procedure which may be followed for monitoring the condition of the oil passage through the nozzle structure in both of the illustrated embodiments is as follows, keeping in mind that the kiln operates continuously 24 hours per day. Despite the advantage obtained by the cooling feature previously discussed, such monitoring is nevertheless desirable. Also various unusual changes in operating conditions of the kiln may tend to accelerate undesirable deposits or build-ups in the oil passage.

1. Once each shift (i.e., once in every 8 hours) the elements of the quick disconnect coupling 68 of a given nozzle 20 are disconnected from each other to permit insertion of a cleaning rod into the typically ⅛ inch diameter passage 39 of the oil tube 38. This cleaning rod is actually a wire having a diameter just slightly less than that of passage 39. The cleaning rod is inserted for the entire length of the oil tube 38 and is additionally projected through the passage 42 including orifice 60 of the nozzle tip 40 (FIG. 1) or through similar passage 110 and orifice 110' of nozzle tip 104 (FIG. 2). If the cleaning rod can be pushed all the way through without difficulty to the extreme radially inner end of orifice 60 of passage 42 or orifice 110' of passage 110, the cleaning rod is then withdrawn and it can be assumed that there is a thru oil passage all the way from the radially outer end of oil tube 38 to the radially inner end of nozzle tip 40 (FIG. 1) or of nozzle tip 104 (FIG. 2). In this case, the quick disconnect coupling 68 is then recoupled.

2. If, on the other hand, difficulty is experienced in cleaning passage 42 and orifice 60 thereof (FIG. 1) or passage 110 and orifice 110' thereof (FIG. 2) by use of the wire rod as just described in step 1, the compression fitting 58 may be loosened to permit oil tube 38 to be linearly moved until the reduced diameter portion 38A of the oil tube 38 passes through the orifice 60 of outlet passage 42 of nozzle tip 40 as shown in phantom outline in FIG. 1, or until the reduced diameter portion 38A' of oil tube 38' passes through orifice 110' of passage 110 of nozzle tip 104 as shown in phantom outline in FIG. 2. Linear movement of the oil tube 38 as just described will also eject carbon deposits or the like from the space 41 bounded by the interior wall of sleeve 36 near the normally radially inner portion of sleeve 36 relative to the kiln axis or from the similar space 41' of the embodiment of FIG. 2.

3. If the deposits of carbon or other extraneous material are so tightly packed in the passage 42 (FIG. 1) or 110 (FIG. 2) that movement of the oil tube 38 as described in step 2 has been unable to remove such deposits, the oil tube 38 may be removed and a special tool may be inserted into sleeve 36 in place of oil tube 38, such sleeve having a special reaming tip or the like which may be used to ream out and clean out passage 42 of nozzle tip 40 and its orifice 60 (FIG. 1) or passage 110 of nozzle tip 104 (FIG. 2) and its orifice 110'.

After the special cleaning tool has performed its operation, the oil tube 38 may again be positioned in sleeve 36, or a new clean oil tube may replace the one that was removed, if desired, and the compression fitting 58 is tightened into engagement with the outer surface of the oil tube.

4. If difficulty is encountered in cleaning the oil tube 38 by means of a wire rod or the like, the entire oil tube 38 may be removed and may be replaced by a new or cleaned oil tube and the compression fitting 58 again tightened in place to hold the replacement oil tube in position properly.

In the specification while the tube 38 has been referred to as an "oil tube" and oil has been referred to as the liquid fuel passing through tube 38, these designations have been used only by way of example and to simplify the description. It will be understood that tube 38 may be used to deliver any suitable type of liquid fuel to the reduction kiln. This liquid fuel would normally be a liquid hydrocarbon such as oil.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A nozzle for use with a rotary kiln of the type used for reducing ore to a lower state of oxidation, including a hollow nozzle body adapted to extend through the kiln wall from the exterior of the kiln to finally communicate with the interior of the kiln, means forming a closure for said nozzle body at the normally radially outer end thereof (relative to the kiln axis), a nozzle tip forming a closure contiguous the normally radially inner end of said nozzle body, a fluid passage for liquid fluid through said nozzle tip, a hollow sleeve member extending through said nozzle body for substantially the entire length of said nozzle body at least to said nozzle tip and being in fluid communication with said fluid passage through said nozzle tip, said sleeve member being spaced radially inwardly from the inner surface of said nozzle body relative to the longitudinal axis of said nozzle whereby to define a hollow chamber between said sleeve member and said nozzle body, a liquid fuel tube slidably received within the hollow interior of said sleeve member and slidably movable into cleaning relation to said nozzle tip, said liquid fuel tube being adapted to be connected contiguous a radially outer end thereof to a source of liquid fuel, an inlet port in said nozzle body for admitting a gaseous fluid into the hollow chamber of said nozzle body which surrounds said sleeve member, an outlet port contiguous the normally radially inner end of said nozzle body and adapted to communicate with the interior of the kiln, said outlet port communicating with said hollow chamber of said nozzle body whereby gaseous fluid admitted to said inlet port may pass through said hollow chamber to said outlet port and thence into the kiln.

2. A nozzle as defined in claim 1 in which said liquid fuel tube is linearly movable in said sleeve member and into the fluid passage through said nozzle tip whereby to clean carbon deposits or the like from the interior of said sleeve member and from said nozzle tip.

3. A nozzle as defined in claim 1 including means for holding said liquid fuel tube fixed at an adjusted position relative to said hollow sleeve member whereby to normally locate the discharge end of said liquid fuel tube at an optimum position relative to said nozzle tip.

4. A nozzle as defined in claim 1 in which said hollow sleeve member projects through and extends beyond said closure at the normally radially outer end of said nozzle body, said liquid fuel tube projecting through and beyond the normally radially outer end of said hollow sleeve member, and means carried by said hollow sleeve member contiguous the radially outer end of said sleeve member for detachably gripping said liquid fuel tube whereby to hold said liquid fuel tube at a desired adjusted position relative to said hollow sleeve member and also relative to said nozzle tip.

5. A nozzle as defined in claim 4 in which said means carried by said hollow sleeve member can be loosened to ungrip said liquid fuel tube whereby said liquid fuel tube may be linearly moved in said sleeve member to clean carbon deposits or the like from the interior of said sleeve member and from said nozzle tip, or to permit adjustment of said liquid fuel tube whereby to locate the discharge end of said liquid fuel tube at an optimum position relative to said nozzle tip, or to permit removal and replacement of said liquid fuel tube.

6. A nozzle member as defined in claim 5 in which said means carried by said hollow sleeve member is a reusable compression fitting.

7. A nozzle as defined in claim 1 including a quick disconnect coupling adapted to normally connect the normally radially outer end of said liquid fuel tube to a liquid fuel supply, the elements of said quick disconnect coupling which are respectively connected to said liquid fuel tube and to said liquid fuel supply being detachable from each other to permit insertion of a cleaning rod or wire into the bore of said liquid fuel tube for cleaning said liquid fuel tube, or to permit removal and replacement of said liquid fuel tube.

8. A nozzle member as defined in claim 1 including a baffle member in the space between said hollow sleeve member and the inner surface of said nozzle body in the region of said oulet port for preventing ore from falling through said outlet port into said space.

9. A nozzle member as defined in claim 1 in which the diameter of the oil passage through said oil tube is substantially smaller than the internal diameter of said hollow sleeve member.

10. A nozzle member as defined in claim 1 in which said nozzle is adapted to project into the interior of the kiln, and said oulet port is in a wall of said nozzle body which lies on a radially outer boundary of said nozzle body relative to the longitudinal axis of said nozzle body, and which wall is adapted to project into the interior of said kiln, whereby gaseous fluids exit into the kiln from said nozzle in a direction which is generally radial of the longitudinal axis of said nozzle body.

11. A nozzle as defined in claim 1 in which said nozzle tip is provided with passages therethrough communicating with said hollow chamber of said nozzle body, whereby to constitute the gaseous fluid outlet port of said nozzle.

12. A nozzle as defined in claim 11 in which the radially inner surface of said nozzle tip, relative to the kiln axis, is adapted to be positioned substantially flush with the inner periphery of the kiln.

13. A nozzle as defined in claim 1 in which said fluid passage through said nozzle tip includes a reduced diameter discharge orifice and said liquid fuel tube is provided with a reduced diameter end portion at the normally radially inner end thereof which is linearly movable with a sliding fit through said discharge orifice.

14. A nozzle for use with a rotary kiln of the type used for reducing ore to a lower state of oxidation, including a hollow nozzle body adapted to extend through the kiln wall from the exterior of the kiln to fluidly communicate with the interior of the kiln, means forming a closure for said nozzle body at the normally radially outer end thereof (relative to the kiln axis), a nozzle tip forming a closure contiguous the normally radially inner end of said nozzle (relative to the kiln axis), a fluid passage for liquid fluid through said nozzle tip, a hollow sleeve member, said sleeve member extending through said nozzle body for substantially the entire length of said nozzle body at least to said nozzle tip and being in fluid communication with said fluid passage through said nozzle tip, a liquid fuel tube slidably received within the hollow interior of said sleeve member and slidably movable into cleaning relation to said nozzle tip, said liquid fuel tube being adapted to be connected contiguous a radially outer end thereof to a source of liquid fuel, said liquid fuel tube projecting through and beyond the normally radially outer end of said hollow sleeve member, and means carried by said hollow sleeve member contiguous the radially outer end of said sleeve member for detachably gripping said liquid fuel tube whereby to hold said liquid fuel tube fixed at a desired adjusted position relative to said hollow sleeve member and also relative to said nozzle tip.

15. A nozzle as defined in claim 14 in which said liquid fuel tube is linearly movable in said sleeve member and into the fluid passage through said nozzle tip whereby to clean carbon deposits or the like from the interior of said sleeve member and from said nozzle tip.

16. A nozzle as defined in claim 15 in which said means for holding said liquid fuel tube fixed at an adjusted position relative to said hollow sleeve member is effective to locate the discharge end of said liquid fuel tube at an optimum position relative to said nozzle tip.

17. A nozzle as defined in claim 14 in which said means carried by said hollow sleeve member can be loosened to ungrip said liquid fuel tube whereby said liquid fuel tube may be linearly moved in said sleeve member to clean carbon deposits or the like from the interior of said sleeve member and from said nozzle tip, or to permit adjustment of said liquid fuel tube whereby to locate the discharge end of said liquid fuel tube at an optimum position relative to said nozzle tip, or to permit removal and replacement of said liquid fuel tube.

18. A nozzle member as defined in claim 14 in which said means carried by said hollow sleeve member is a reusable compression fitting.

19. A nozzle as defined in claim 14 including a quick disconnect coupling adapted to normally connect the normally radially outer end of said liquid fuel tube to a liquid fuel supply, the elements of said quick disconnect coupling which are respectively connected to said liquid fuel tube and to said liquid fuel supply being detachable from each other to permit insertion of a cleaning rod or wire into the bore of said liquid fuel tube for cleaning said liquid fuel tube, or to permit removal and replacement of said liquid fuel tube.

20. A nozzle as defined in claim 14 in which said fluid passage through said nozzle tip includes a reduced diameter discharge orifice and said liquid fuel tube is provided with a reduced diameter end portion at the normally radially inner end therof which is linearly movable with a sliding fit through said discharge orifice.

21. A nozzle as defined in claim 14 in which said hollow sleeve member projects through and extends beyond said closure at the normally radially outer end of said nozzle body, said liquid fuel tube projecting through and beyond the normally radially outer end of said hollow sleeve member, and means carried by said hollow sleeve member contiguous the radially outer end of said sleeve member for detachably gripping said liquid fuel tube whereby to hold said liquid fuel tube at a desired adjusted position relative to said hollow sleeve member and also relative to said nozzle tip.

22. A nozzle for use with a rotary kiln of the type used for reducing ore to a lower state of oxidation, including a hollow nozzle body adapted to extend through the kiln wall from the exterior of the kiln to fluidly communicate with the interior of the kiln, means forming a closure for said nozzle body at the normally radially outer end thereof (relative to the kiln axis), a nozzle tip forming a closure for the normally radially inner end of said nozzle (relative to the kiln axis), a fluid passage for liquid fluid through said nozzle tip, a hollow sleeve member, said sleeve member extending through said nozzle body for substatially the entire length of said nozzle body at least to said nozzle tip and being in fluid communication with said fluid passage through said nozzle tip, a liquid fuel tube slidably received within the hollow interior of said sleeve member and adjustably slidably movable into a desired optimum position relative to said nozzle tip, said liquid fuel tube being adapted to be connected contiguous a radially outer end thereof to a source of liquid fuel, said liquid fuel tube projecting through and beyond the normally radially outer end of said hollow sleeve member, and means carried by said hollow sleeve member contiguous the radially outer end of said sleeve member for detachably gripping said liquid fuel tube whereby to hold said liquid fuel tube fixed at a desired adjusted position relative to said hollow sleeve member and also relative to said nozzle tip.

* * * * *

UNITED STATES PATENT OFFICE
CERTIFICATE OF CORRECTION

Patent No. 3,946,949　　　　　　　　Dated March 30, 1976

Inventor(s) Eugene F. Rossi

It is certified that error appears in the above-identified patent and that said Letters Patent are hereby corrected as shown below:

Column 12, line 51, "finally" should read --- fluidly --- .

Signed and Sealed this

Twenty-seventh Day of July 1976

[SEAL]

Attest:

RUTH C. MASON
*Attesting Officer*

C. MARSHALL DANN
*Commissioner of Patents and Trademarks*